United States Patent [19]

Takeda

[11] Patent Number: 5,776,407
[45] Date of Patent: Jul. 7, 1998

[54] INJECTION MOLDING APPARATUS AND METHOD FOR SHUTTING GATE AND COMPRESSING MOLD MATERIAL

[75] Inventor: Yoshinobu Takeda, Niigata, Japan

[73] Assignee: Mitsubishi Materials Corporation, Tokyo, Japan

[21] Appl. No.: 721,249

[22] Filed: Sep. 26, 1996

[51] Int. Cl.$^6$ .................................................. B29C 45/26
[52] U.S. Cl. .................. 264/328.7; 425/566; 425/575; 425/590; 264/328.11
[58] Field of Search ........................ 264/2.2, 328.7, 264/40.1, 40.5, 328.11; 425/145, 150, 555, 556, 589, 590, 553, 566, 571, 575

[56] References Cited

U.S. PATENT DOCUMENTS

| | | | |
|---|---|---|---|
| 4,290,744 | 9/1981 | Dannels et al. | 264/328.7 |
| 4,900,242 | 2/1990 | Maus et al. | 264/328.7 |
| 4,979,891 | 12/1990 | Kitamura | 425/589 |
| 5,015,426 | 5/1991 | Maus et al. | 264/328.7 |
| 5,068,065 | 11/1991 | Maus et al. | 264/328.7 |
| 5,093,049 | 3/1992 | Uehara et al. | 264/328.7 |
| 5,385,461 | 1/1995 | Machida | 264/328.1 |
| 5,415,817 | 5/1995 | Shiao et al. | 264/328.7 |
| 5,472,334 | 12/1995 | Takahashi | 264/328.7 |
| 5,476,629 | 12/1995 | Yabe et al. | 264/328.7 |

FOREIGN PATENT DOCUMENTS

| | | |
|---|---|---|
| 60-196321 | 10/1985 | Japan . |
| 62-60624 | 3/1987 | Japan . |
| 63-94808 | 4/1988 | Japan . |
| 6-71698 | 3/1994 | Japan . |

*Primary Examiner*—Jill L. Heitbrink
*Attorney, Agent, or Firm*—Quarles & Brady

[57] ABSTRACT

A mold assembly has a fixed mold incorporating a base with a movable member supported thereon so as to be movable relative thereto and which is closed against a movable mold by a spring. A protrusion on the base passing through the movable member, and a recess on the movable mold engage to form a cavity. A runner and a gate are formed between the movable member and movable mold. Resin is filled into the cavity with the mold lightly closed and the movable member and movable mold closed, but with the movable member and base apart. During filing, the movable member and base open under resin pressure which is held constant inside the cavity. The movable member and base are then closed and when the gate closes with engagement of the protruding and recess portions, a constant amount of resin remains in the mold cavity, which is then compressed.

6 Claims, 14 Drawing Sheets

FIG. 2

INJECTION MOLDING APPARATUS AND METHOD FOR SHUTTING GATE AND COMPRESSING MOLD MATERIAL

BACKGROUND OF THE INVENTION

1. Field of the Invention

The present invention relates to an injection molding apparatus for moldable materials such as resin, a mold assembly for use with this injection molding apparatus, and an injection molding method. In particular the invention relates to an apparatus and method for shutting of a gate and compressing mold material inside a mold cavity.

2. Description of the Related Art

In the injection molding of thermoplastic resins, the mold product is formed for example by introducing a molten resin into a mold cavity formed in a mold assembly, and then cooling so that the resin solidifies.

With conventional injection molding, a measuring step, a filling step and a dwelling step are carried out by a molding machine. When an in-line screw type molding machine is adopted for example, then with the heated cylinder unit, a predetermined quantity of molten resin accumulates at a tip end of the cylinder body as a rotating screw is moved back (measuring step). The screw is then advanced to inject the resin from a nozzle at the tip end of the cylinder body into the mold, thereby filling the mold cavity with resin (filling step). After this, an appropriate pressure is applied to the resin inside the cylinder body by means of the screw, so as to top up the mold cavity with the contraction amount of resin due to cooling (dwelling step).

Since the volume of the mold cavity in the mold assembly is fixed, the pressure and volume of the resin filled into the mold cavity is basically determined by control on the molding machine side. Therefore, if there is an error in the molding machine control, this will result in an error in the pressure and the volume of the resin filled into the mold cavity. To remedy this error, precise control for the screw of the molding machine has been considered. However there are various causes of the error such as variations in temperature, and the properties of the resin itself. For example, if there is a long resin passage from the screw to the mold cavity, and an error arises in this resin passage, then even with precise screw control, there will still be an error in the pressure and volume of the resin filled into the mold cavity. Consequently, it is difficult to remedy errors occurring in the mold cavity by merely controlling the molding machine.

Furthermore, with conventional injection compression molding, as disclosed for example in Japanese Unexamined Patent Publication No. 6-71698, after filling the mold cavity with resin, the volume of the mold cavity itself is reduced, for example by moving a part constituting part of the mold assembly and changing the mold clamping force, to thereby reduce the volume of the mold cavity and compress the resin thereinside.

However, in reducing the volume of the mold cavity to compress the resin, there is no function to remedy errors in the pressure and volume of the resin filled into the mold cavity.

With injection compression molding, where compression is carried out after closing a gate between the resin passage and the mold cavity, conventional mold assemblies have had the device for closing the gate and the device for compressing arranged separately. With the mold assembly disclosed in Japanese Unexamined Patent Publication No. 6-71698 however, the device for closing the gate and the device for compressing are made common. To achieve this, a sleeve is movably fitted to a fixed side mold plate, so as to be movable in the mold open and close direction, and this sleeve is biased by a spring towards a movable side mold plate. Moreover, a mold cavity is formed by a recess portion in the fixed side mold plate and a protruding portion on the movable side mold plate. In operation, at first the mold is closed with a light mold clamping force, so that the movable side mold plate is abutted against the sleeve, but the fixed side mold plate and the movable side mold plate remain slightly open so that the recess portion and the protruding portion are not engaged, and in this condition resin is filled into the mold cavity. The mold clamping force is then increased so that the fixed side mold plate and the movable side mold plate close, and the recess portion and the protruding portion engage, thereby closing the gate and carry out compression.

With the mold assembly disclosed in the abovementioned publication however, since the resin passage to the mold cavity is formed by a gap between the fixed side mold plate and the movable side mold plate, then with closing of the fixed side mold plate and the movable side mold plate, the resin in the resin passage is compressed and must either flow into the mold cavity, or return to the molding machine side. Even supposing that the resin inside the resin passage returns to the molding machine side, since the resin in the resin passage in the vicinity of the mold cavity is subjected to compression by the fixed side mold plate and the movable side mold plate, then the final resin quantity and pressure inside the mold cavity can vary.

Moreover, in the beforementioned publication there is no mention of a means for sealing the resin passage formed between the fixed side mold plate and the movable side mold plate, from the outside. With the mold assembly disclosed in this publication, as far as can be inferred from the drawings, the resin in the resin passage can leak to the outside.

SUMMARY OF THE INVENTION

In view of the above problems, it is an object of the present invention to be able to accurately control the pressure and volume of mold material introduced into a mold cavity.

In order to achieve the above object, the present invention uses a mold assembly incorporating a first mold member and a second mold member which open and close relative to each other and which form a mold cavity therebetween when closed, the first mold member having: a base member; a movable member supported on the base member so as to be movable relative thereto in the open and close direction of the first mold member and the second mold member, and which closes against the second mold member; and a biasing device for biasing the movable member relative to the base member towards the second mold member, the construction being such that with the second mold member and the movable member in a closed condition, the volume of the mold cavity is changed by opening and closing the movable member and the base member relative to each other, and a gate between a material passage and the mold cavity is closed with the closing of the movable member and the base member towards each other.

The present invention also uses a material supply apparatus for supplying mold material in a moldable condition to the material passage in the mold assembly, and a mold clamping device with adjustable clamping force for opening and closing the first mold member and the second mold member of the mold assembly.

The method of the invention involves a filling step where, the first mold member and the second mold member are closed with a light mold clamping force and the movable member is closed against the second mold member, but the movable member and the base member remain in an open condition. Mold material is then supplied from the material supply device to the material passage in the mold assembly to fill the mold cavity. Concurrent with this step is a pressure adjusting step where the pressure of the mold material inside the mold cavity is adjusted by the displacement of the movable member together with the second mold member relative to the base member, as a result of an equilibrium between the pressure of the mold material inside the mold assembly, and the mold clamping force.

Then follows a measuring step where supply of mold material from the material supply device is stopped and the mold clamping force increased to close the base member and the movable member towards each other. During this operation some of the mold material on the mold cavity side returns to the material supply device side, and at the point in time of closing the gate, a constant amount of mold material remains in the mold cavity. Then follows a compression step where the base member and the movable member are closed against each other, thereby compressing the mold material inside the mold cavity.

By having the pressure adjusting step, then even if there is an error in the amount of mold material supplied from the material supply device, this error is absorbed by the displacement of the movable member together with the second mold member relative to the base member, so that the pressure of the mold material inside the mold cavity remains constant. At the point in time where the pressure adjusting step is completed, the amount of mold material inside the mold cavity is not constant. However in the following measuring step, some of the mold material on the mold cavity side returns to the material supply device with the closing of the base member and the movable member towards each other, and at the point in time of closing the gate, a constant amount of mold material remains in the mold cavity. The pressure and volume of the mold material introduced into the mold cavity can therefore be easily and accurately controlled by the pressure adjusting step and the measuring step. Consequently, products of high accuracy and consistent quality are obtained. Since the mold material inside the mold cavity is compressed after closing the gate, this compensates for the contraction accompanying solidification of the mold material, and hence pressure holding control on the material supply device side is no longer required for this compensation.

As a basic form for the mold assembly, the first mold member may have a protruding portion provided integral with the base member and the second mold member may have a recess portion for removably engaging with the protruding portion on the first mold member, the construction being such that the mold cavity is formed by the recess portion and the protruding portion, and the gate is closed by the protruding portion engaging in the recess portion. Moreover, the material passage may be formed between the movable member and the second mold member. In addition, the biasing device may comprise for example a spring which applies a biasing force to the movable member, the force being set so as to hold the movable member and the second mold member closed together against a pressure force of the mold material inside the material passage.

When the material passage is formed between the movable member and the second mold member in this way, then the pressure applied to the base member, that is to say the pressure of the mold material related to the adjustment pressure, is only applied to the base member in the mold cavity, and hence the pressure of the mold cavity is adjusted to a reference pressure. On the other hand, the pressure of the mold material inside the material passage acts so as to open (separate) the movable member and the second mold member. However this pressure is opposed by the biasing device and hence the movable member and the second mold member are held in the closed condition. Moreover, in the measuring step, since the volume of the material passage does not change, then the mold material inside the mold cavity returns smoothly to the material passage, and hence the pressure of the mold material inside the mold cavity remains constant. Consequently, the adjustment pressure and the measured quantity can be more accurate.

Moreover, the mold assembly may have an overflow portion which is cut-off from the mold cavity when the protruding portion is engaged in the recess portion, extending substantially around the full periphery of the mold cavity. To achieve this, the movable portion with the protruding portion sliding therethrough, may have formed therein surrounding the protruding portion, a depression forming the material passage and gate as well as the overflow portion.

With such an overflow portion, gases and mold material can flow out from the region around the mold cavity to the overflow portion during the filling step, thus improving the fluidity of the mold material in this region. Hence the mold material can be smoothly and completely filled up to the peripheral portion of the mold cavity. As a result, the properties of the molded product such as dimensions at the peripheral portions, can be improved. In the subsequent measuring step, the mold material inside the mold cavity returns through the gate to the material passage side, and/or flows to the overflow portion. The gate is then closed, shutting off the overflow portion from the mold cavity, after which the mold material inside the mold cavity is compressed.

Due to the overflow portion, the cooling of the mold material in the region around the mold cavity is slowed down. Hence during the measuring step, the mold material flows more smoothly from the mold cavity to the material passage and the overflow portion, and hence the mold closing operation including the compression step can be more rapid.

BRIEF DESCRIPTION OF THE DRAWINGS

As follows is a description of the present invention based on actual examples, with reference to the drawings.

FIG. 2 is a cross-sectional view of part of the mold assembly of FIG. 1, shown during a pressure adjusting step;

DESCRIPTION OF THE PREFERRED EMBODIMENTS

Figure 7:
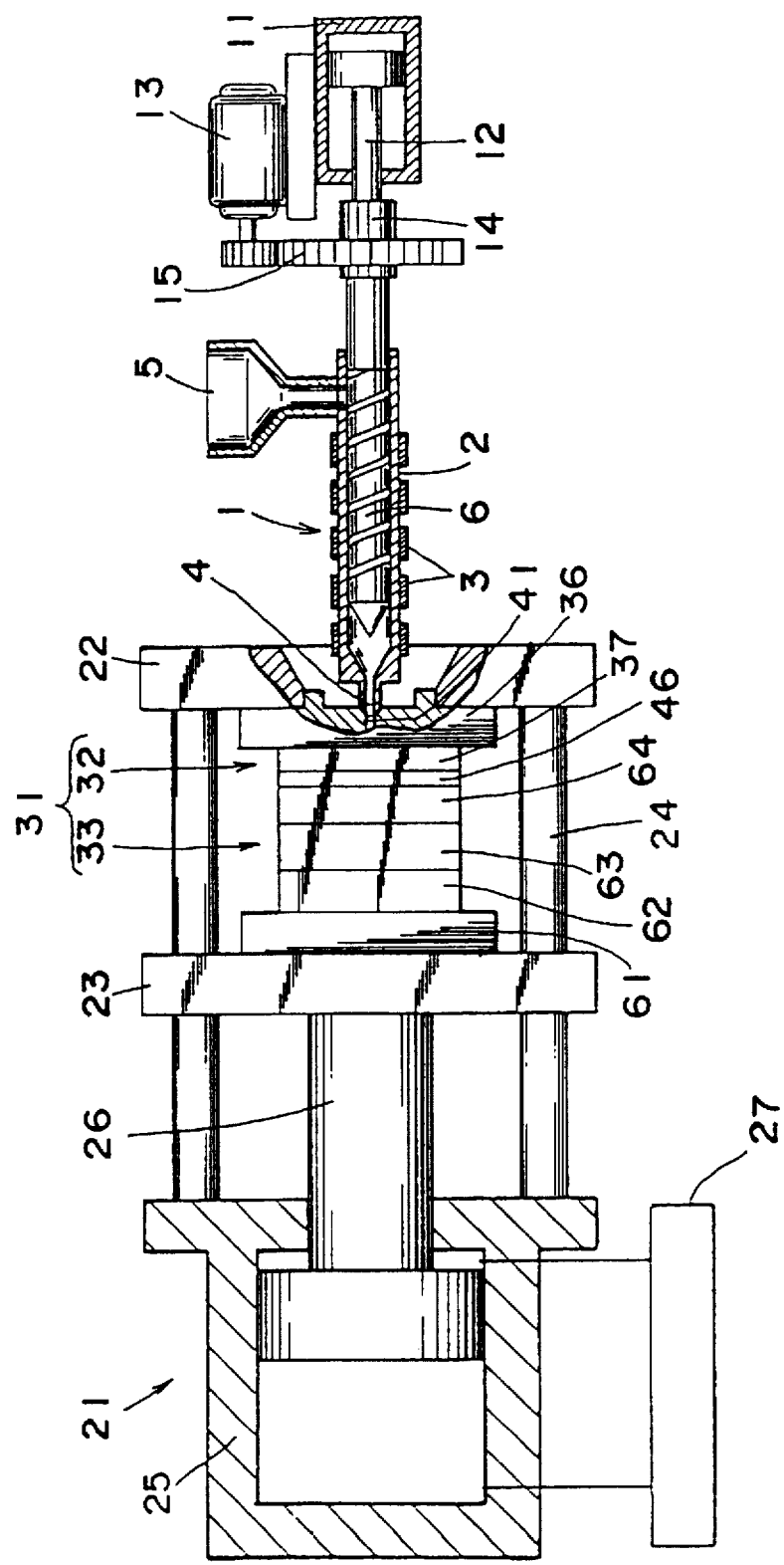
FIG. 7 is a side view with one part in section, showing an outline of a complete injection molding apparatus used in the first embodiment of the present invention.

FIG. 1 through FIG. 7 show a first embodiment of the present invention. This embodiment is applied to injection molding with thermoplastic resin mold materials, using an in-line screw type injection molding machine as shown in FIG. 7. In FIG. 7, numeral 1 indicates a material supply device in the form of a heated cylinder unit. The heated cylinder unit 1 has a cylinder body 2 provided with a heater 3 around the periphery, and a nozzle 4 at a tip end thereof (left end in FIG. 7). A hopper 5 is provided at a rear upper portion of the cylinder body 2. A screw 6 is accommodated in the cylinder body 2 so as to be freely rotatable and axially slidable thereinside (in the left/right direction in FIG. 7). A piston rod 12 of a hydraulic cylinder 11 is fixedly connected to a rear end of the screw 6. The hydraulic cylinder 11 is for driving the screw 6 in the axial direction. Moreover, the screw 6 is rotated by an electric servomotor 13. A rotational drive transmission gear 15 for transmitting rotation from the servomotor 13 to the screw 6, is engaged with a spline on a spline tube 14 fixedly secured to the outer periphery of the piston rod 12. The gear 15 is thus rotationally fixed relative to the screw 6 which is free to move relative thereto in the axial direction.

Numeral 21 indicates a direct pressure mold clamping device. The mold clamping device 21 has a fixed side platen 22 and a movable side platen 23. The movable side platen 23 is movable along tie bars 24 in the left and right direction in FIG. 7, and is driven by a hydraulic cylinder 25 through a mold clamping ram 26. Drive of the hydraulic cylinder 25 is controlled by means of a drive control unit 27 comprising for example servo valves, so that the mold clamping pressure can be adjusted. A fixed mold 32 of a mold assembly 31 is fitted to the fixed side platen 22, while a movable mold 33 of the mold assembly 31 is fitted to the movable side platen 23. The mold clamping device 21 and the heated cylinder unit 1 are collectively controlled by a control device such as a computer.

Next is a detailed description of the structure of the mold assembly 31, with reference to FIG. 1 through FIG. 6. In FIG. 1 through FIG. 6 the thick line hatching indicates resin.

The fixed mold 32 (first mold) and the movable mold 33 (second mold) are opened and closed relative to each other by movement of the movable side platen 23, and when the molds are closed, a mold cavity 34 in the shape of a product to be molded is formed therebetween. Here the product to be molded is a cylindrical roller 101 (see FIG. 5), aligned axially with the open and close direction of the fixed mold 32 and the movable mold 33. For simplicity the description hereunder is given for a single mold product, however as is apparent from FIG. 1 through FIG. 4, the mold assembly is in fact designed for producing a plurality of products. Furthermore, description of some of the components of the mold assembly is given hereunder in relation to a single component even though it will be clear from the drawings that there is more than one.

The fixed mold 32 comprises a fixed side attachment plate 36 fitted to the fixed side platen 22, and a fixed side receiving plate 37 secured to the face of the fixed side attachment plate 36 on the movable mold 33 side. A base member 38 is made up of the fixed side attachment plate 36 and the fixed side receiving plate 37. A location ring 39 and a sprue bush 40 are secured to the fixed side attachment plate 36. The sprue bush 40 is for connection to the nozzle 4 of the heated cylinder unit 1, the inside forming a sprue 41 (material passage) which passes through the fixed side receiving plate 37 towards the movable mold 33 side.

A movable plate 46 (movable member) is supported on the fixed side receiving plate 37 (on the movable mold 33 side), so as to be movable relative thereto over a predetermined range in the mold open and close direction. For this support, a sleeve 50 secured by a stopper 48 and a bolt 49 to the fixed side receiving plate 37 (on the movable mold 33 side), is slidably inserted through the movable plate 46. The stopper 48 abuts with the movable plate 46 on the movable mold 33 side, to thereby set a maximum gap, that is to say, a maximum opening between the movable plate 46 and the base member 38. The movable plate 46 is biased from the base member 38 towards the movable mold 33 by a spring 51 (biasing device), compressed between the fixed side attachment plate 36 and the movable plate 46. A bore 52 is formed in the movable plate 46 for slidingly engaging with a tip portion of the sprue bush 40.

A sleeve 56 is secured to the base member 38, by clamping between the fixed side attachment plate 36 and the fixed side receiving plate 37. The sleeve 56 passes through the fixed side receivingplate 37 and out to the movable mold 33 side. A tip end portion of the sleeve 56 is sliding engaged with a bore 57 formed in the movable plate 46. A tip of the sleeve 56 constitutes a protruding portion 58 which can protrude out from the movable plate 46 to the movable mold 33 side.

The movable mold 33 has a movable side attachment plate 61 (see FIG. 7) attached to the movable side platen 23, a movable side receiving plate 63 secured to a face of the movable side attachment plate 61 (on the fixed mold 32 side) via a spacer plate 62, and a movable side mold plate 64 secured to a face of the movable side receiving plate 63 (on the fixed mold 32 side). The movable side mold plate 64 closes against the movable plate 46 of the fixed mold 32. To provide mutual guidance for the movable side mold plate 64 and the movable plate 46, a guide pin 66 is secured to the movable plate 46, and a bore 67 is formed inthe movable side mold plate 64 for slidingly engaging with the guide pin 66.

A recess portion 71 which removably engages with the protruding portion 58 of the fixed mold 32 is formed in the movable side mold plate 64. A pin 73 formed on a core 72 which is securely inserted into the movable side mold plate 64, protrudes coaxially inside the recess portion 71. The pin 73 removably engages in the sleeve 56 which forms the protruding portion 58 of the fixed mold 32. The engaging face of the protruding portion 58 and the recess portion 71, and the engagingface of the pin 73 and the sleeve 56 constitute cylindrical faces parallel with the mold open and close direction. The gap between these engaging faces is kept minimal to prevent formation of a flash on the molded roller 101. The mold cavity 34 for the finalproduct shape is thus formed by the protruding portion 58 and therecess portion 71. That is to say, the tip end face of the protruding portion 58 forms one end face of the roller 101, the bottom face of the recess portion 71 forms the other end faceof the roller 101, the inner peripheral face of the recess portion 71 forms the outer peripheral face of the roller 101, while the pin 73 forms the inner peripheral face of the roller 101.

A gate 77, and a runner 76 (material passage) communicating between the sprue 41 and the mold cavity 34, are formed between the movable plate 46 of the fixed mold 32 and the movable side mold plate 64 of the movable mold 33. An annular depression surrounding the protruding portion 58 is formed in the face of the movable plate 46 on the movable mold 33 side, thus producing an overflow portion 78 extending completely around the periphery of the mold cavity 34. The overflow portion 78 communicates with the runner 76, forming part of the runner 76, and a gate 77 between the runner 76 and the mold cavity 34. The gate 77 is closed by engagement of the protruding portion 58 of the fixed mold 32 in the recess portion 71 of the movable mold 33. The biasing force on the movable plate 46 from the spring 51, is set to a sufficient force to oppose the pressure force of the resin in the runner 76, and thus hold the movable plate 46 and the movable mold 33 in a closed condition.

An ejector plate (not shown in the figures) is supported between the movable side attachment plate 61 (see FIG. 7) and the movable side receiving plate 63 so as to be movable in the mold open and close direction. Secured to the ejector plate are product ejector pins 82 for ejecting the molded roller 101, and a runner ejector pin 83 for ejecting the solidified resin in the runner 76.

The heated cylinder unit 1, the mold clamping device 21 and the mold assembly 23 constructed as described above, together with a control device such as a computer, constitute a filling control device for carrying out a filling step, a pressure control device for carrying out a pressure adjusting step, a measuring control device for carrying out a measuring step, and a compression control device for carrying out a compression step as described below.

A description of the injection molding method will now be given. A plasticizing step and an injection step are carried out alternately with the heated cylinder unit 1. In the plasticizing step, thermoplastic resin supplied from the hopper 5 to the cylinder body 2 is melted and plasticized by heating with the heater 3 while kneading by rotation of the screw 6. During the plasticizing operation, the resin is fed forward by rotation of the screw 6 and accumulates at the tip end the cylinder body 2, while the screw 6 is moved back by the pressure of the resin. Also during the plasticizing step, an appropriate back pressure is applied to the screw 6 in the forward direction from the hydraulic cylinder 11. When detected that the screw 6 has been moved back to a predetermined position, the screw 6 is advanced by drive from the hydraulic cylinder 11, so that the resin in the tip end of the cylinder body 2 is injected from the nozzle 6 and into the sprue 41 of the mold assembly 31. Then when detected that the screw 6 has been advanced to a predetermined position, or to a mechanical forward limit, the plasticizing process is repeated.

Figure 1:
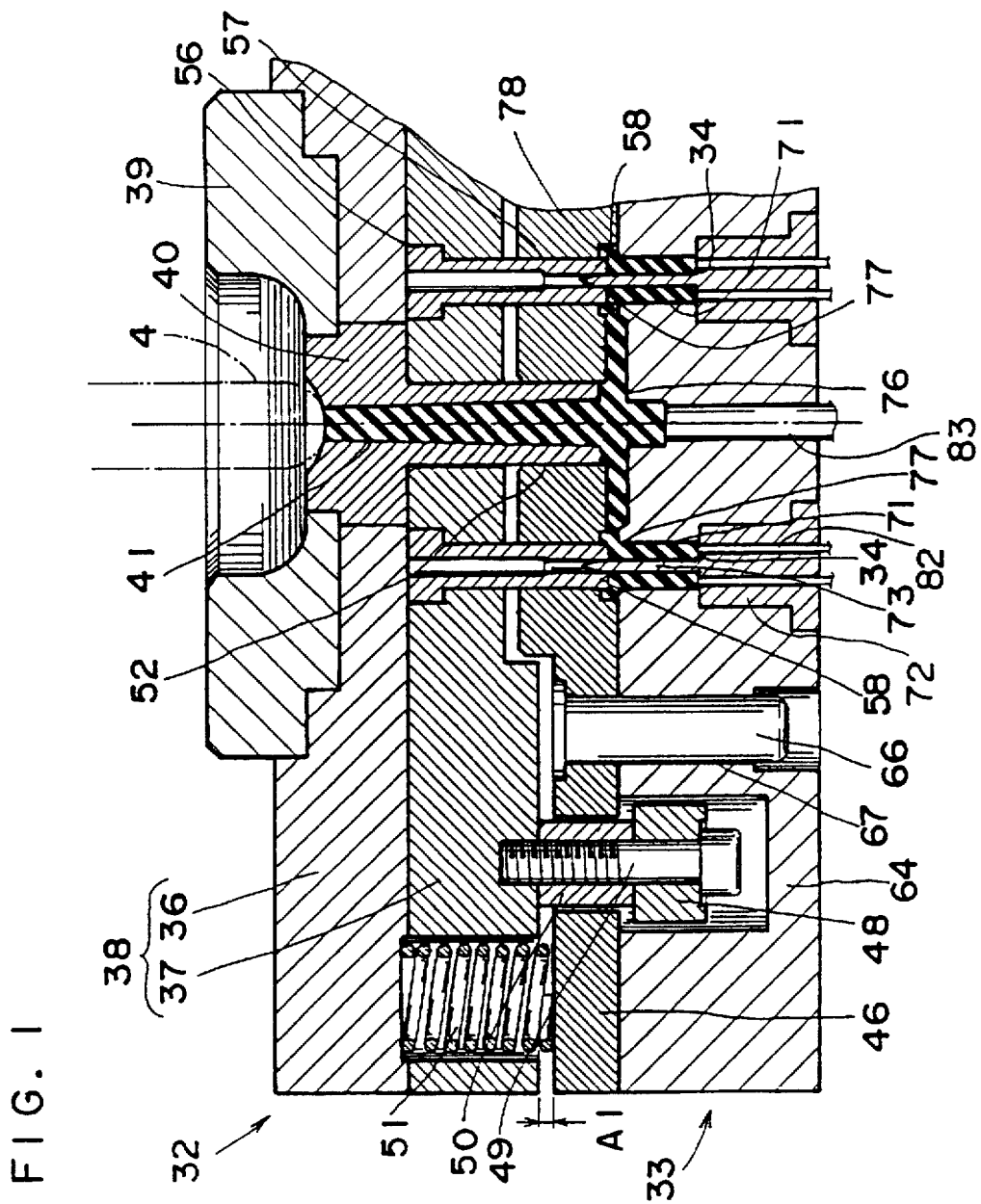
FIG. 1 is a cross-sectional view of a portion of a mold assembly applicable to molding rollers, used in a first embodiment of the present invention, and shown during a filling step.

In the filling step, the mold clamping device 21 first closes the fixed mold 32 and the movable mold 32 with a light constant mold clamping force. At this time, as shown in FIG. 1, the movable plate 46 of the fixed mold 32 is closed against the movable mold 33. On the other hand, the base member 38 of the fixed mold 32 and the movable plate 46 remain open with an initial opening A1, with the stopper 48 not abutted against the movable plate 46. That is to say, the mold clamping force and the force of the spring 51 are in equilibrium. Moreover, the protruding portion 58 of the fixed mold 32 is not engaged in the recess portion 71 of the movable mold 33, and hence the runner 76 is communicated with the mold cavity 34 by means of the open gate77. In this condition, resin is injected into the sprue 41 from the heated cylinder unit 1. This resin passes from the sprue 41 through the runner 76 and the gate 77 to fill the interior of the mold cavity 34.

Figure 2:
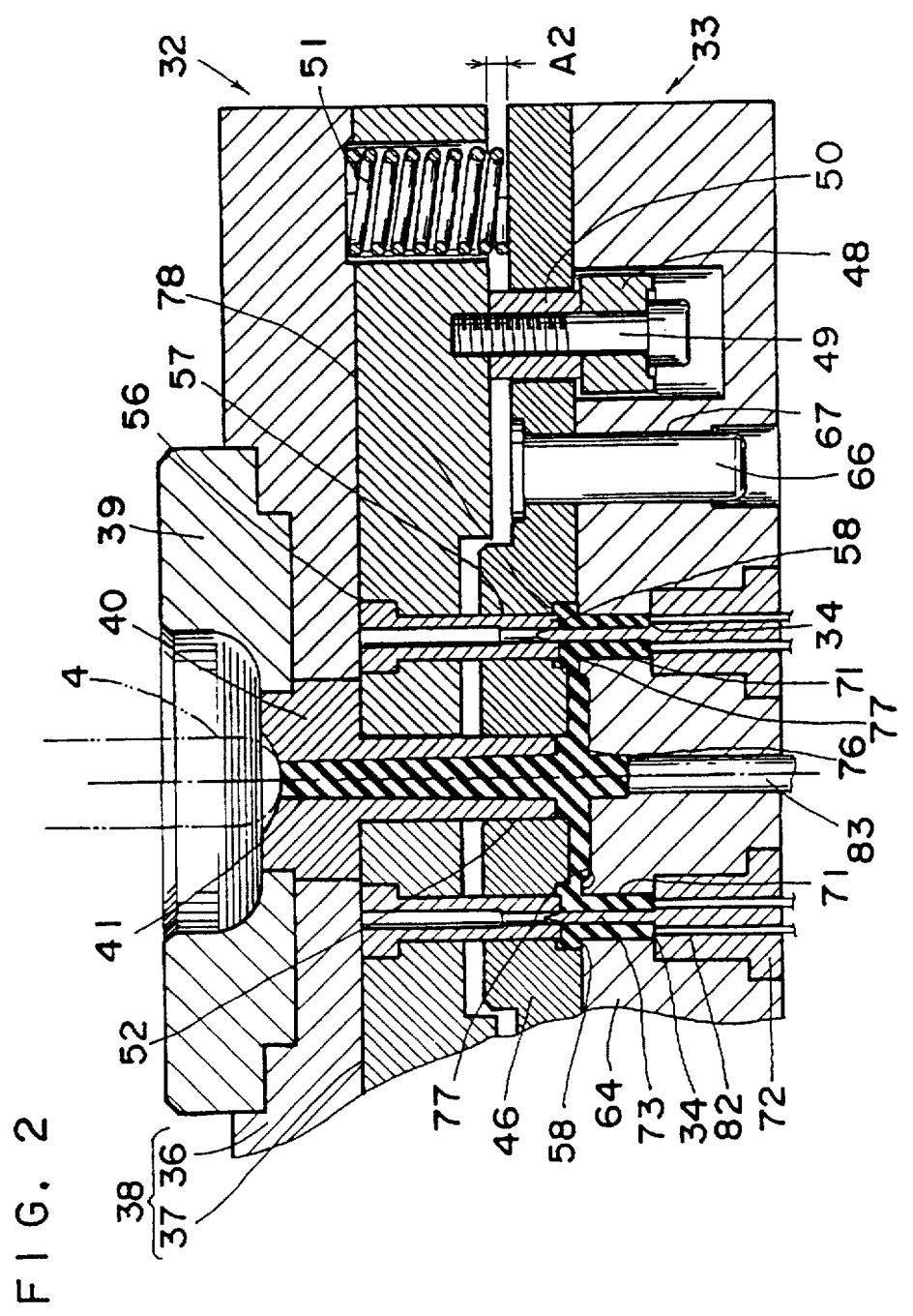

With the pressure adjusting step, even after the mold cavity 34 has been filled with resin, the injection step with the heated cylinder unit 1 continues on until the screw 6 has been advanced to the predetermined position, or to the forward limit, and hence resin supply from the heated cylinder unit 1 to the mold assembly 31 also continues. During this time, the mold clamping force remains light. Therefore, due to the pressure of the resin in the mold assembly 31, the movable plate 46 and the movable mold 33 are displaced away from the base member 38 of the fixed mold 32 as shown in FIG. 2, against the mold clamping force applied by the mold clamping device 21 under conditions of free ingress and egress of oil in the hydraulic cylinder 25. A resultant widened opening A2 between the base member 38 and the movable plate 46 is determined by an equilibrium between the pressure of the resin in the mold assembly 31 and the mold clamping force. More specifically, the opening A2 is determined by an equilibrium between the mold clamping force, and the force of the spring 51 and the resultant backward force of the resin inside the mold assembly 31 on the movable plate 46 together with the movable mold 33. This opening A2 is greater the more the resin supplied to the mold assembly 31. That is to say, if there is an error in the amount of resin supplied from the heated cylinder unit 1, the error is absorbed by a change in the opening. Hence with the pressure adjusting step, the pressure of the resin in the mold cavity 34 is adjusted to remain constant at a reference pressure. As a result, the pressure of the resin in the mold cavity 34 can be accurately controlled.

Due to the increase in the opening from A1 to A2, the force of the spring 51 becomes slightly weaker. Moreover the mold clamping force applied by the hydraulic cylinder 25 also changes slightly due to the mold clamping ram 26 being forced back together with the movable mold 33. However the change in the force of the spring 51 and the mold clamping force is small enough to be ignored. That is to say, the change in the force of the spring 51 corresponding to displacement of the movable plate 46 together with the movable mold 33, and the change in the pressure force of the resin which is in equilibrium with the mold clamping force, are minute compared to the change in pressure arising when different amounts of resin are filled into a constant volume mold cavity. Furthermore, in the beforementioned pressure adjusting step, for the fixed mold 32, the pressure of the resin acting to open (separate) the base member 38 from the movable plate 46 together with the movable mold 33, is the pressure applied to the base member 38 in the mold open and close direction. This is the pressure related to the pressure adjustment. However, with the mold assembly 31 of the embodiment, since the runner 76 is formed between the movable plate 46 of the fixed mold 32 and the movable mold 33, then the pressure of the resin acting to open the base member 38 from the movable plate 46 together with the movable mold 33 is effectively only applied to the base member 38 at the mold cavity 34 (more accurately, including the sprue bush 40). Consequently, the pressure of the mold cavity 34 is adjusted to the reference pressure. On the other hand, the pressure of the resin inside the runner 76 acts so as to open (separate) the movable plate 46 and the movable mold 33. However this pressure is opposed by the force of the spring 51, and hence the movable plate 46 and the movable mold 33 are held in the closed condition. This condition remains the same for the subsequent measuring step.

Figure 3:
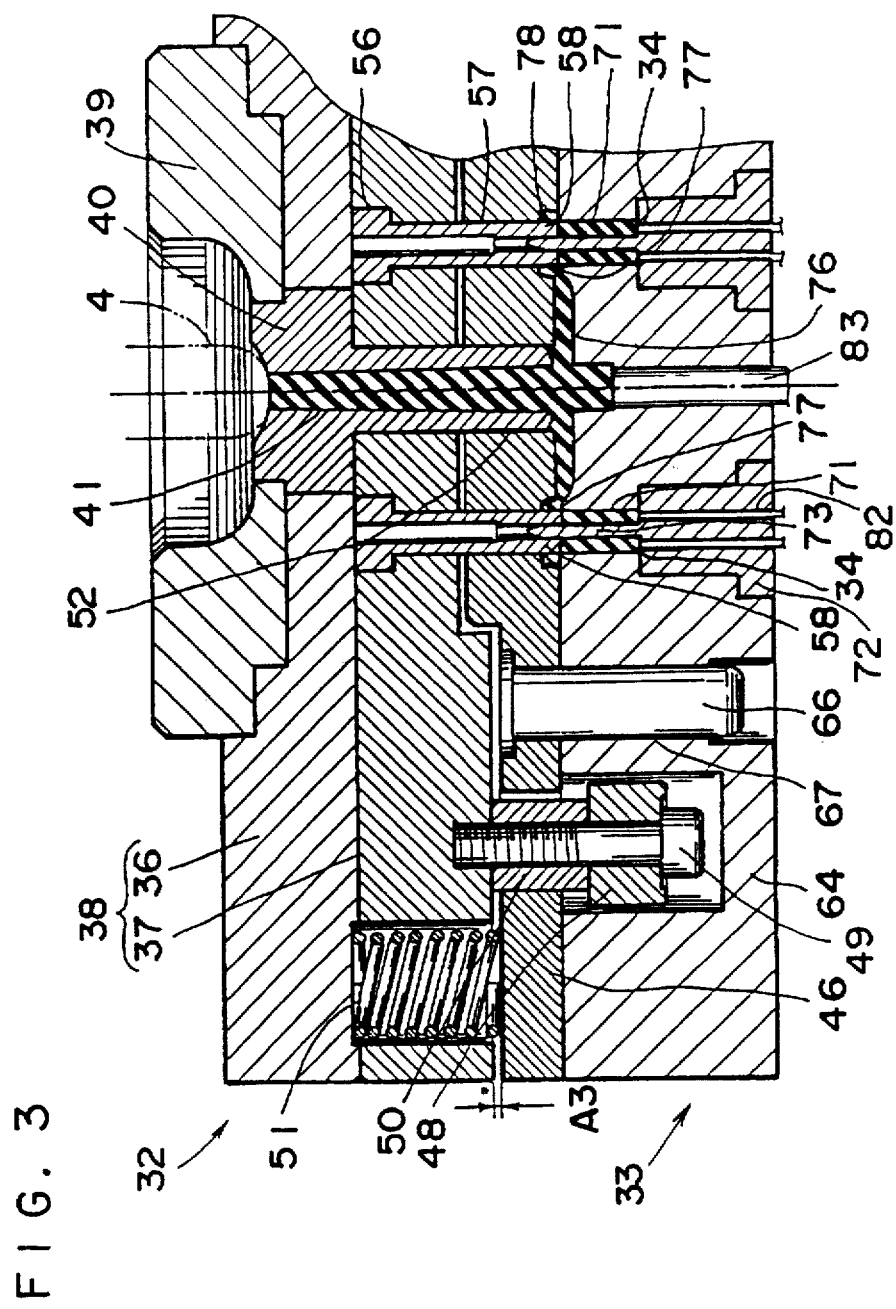
FIG. 3 is a cross-sectional view of part of the mold assembly of FIG. 1, shown during a measuring step.
Figure 4:
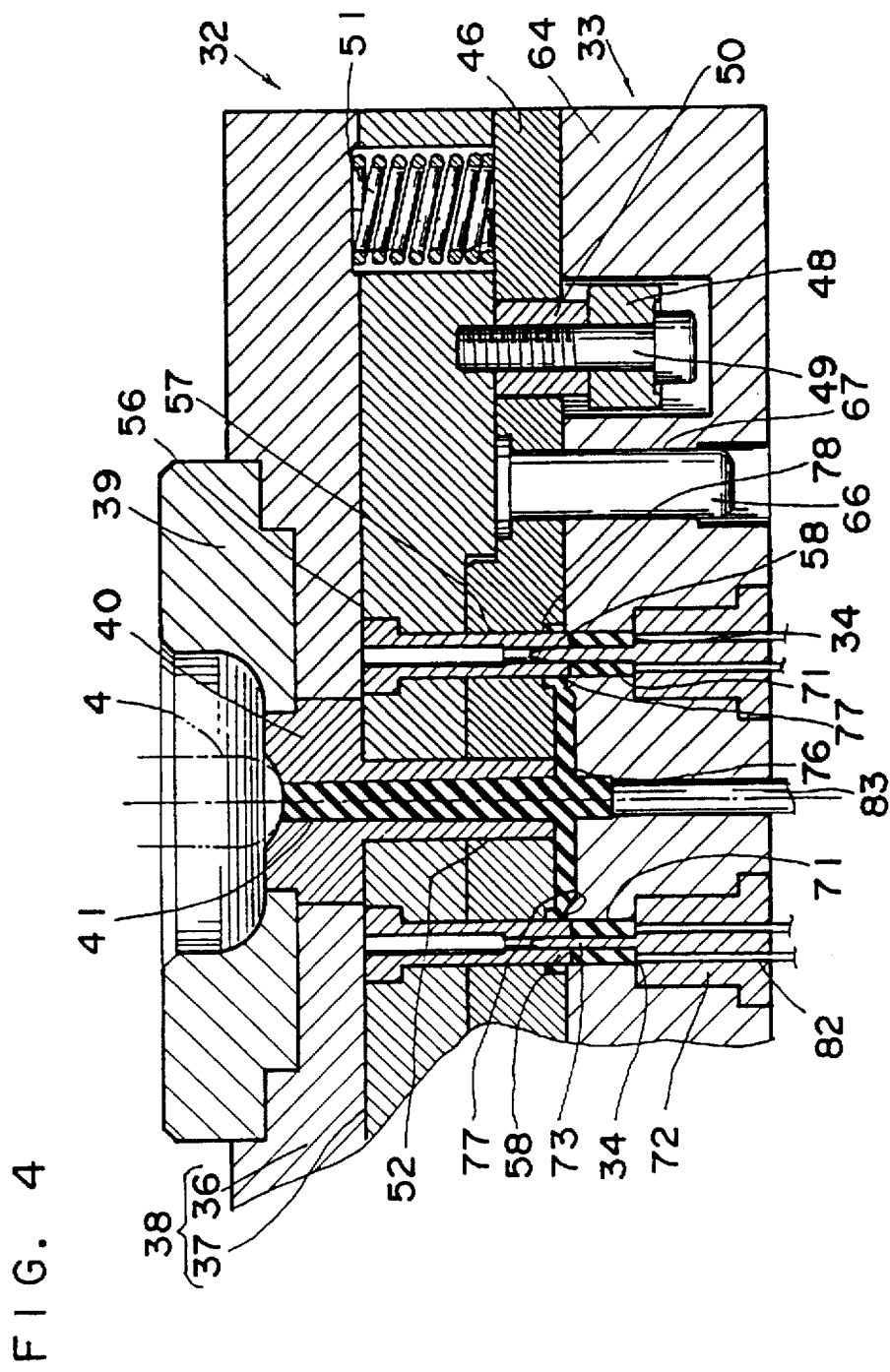
FIG. 4 is a cross-sectional view of part of the mold assembly of FIG. 1, shown during a compression step.

In the measuring step, once the pressure adjusting step is completed, the mold clamping device 21 increases the mold clamping force. As a result, the movable plate 46 is closed against the base member 38 of the fixed mold 32. Concurrent with this, the excess resin inside the mold cavity 34 returns to the runner 76 through the still open gate 77 and/or flows out to the overflow portion 78, so that the resin inside the mold assembly 31 is returned to the cylinder body 2 of the heated cylinder unit 1. The screw 6 therefore retracts to accommodate this amount of returned resin. Then, when as shown in FIG. 3 the protruding portion 58 of the fixed mold 32 engages in the recess portion 71 of the movable mold 33, the gate 77 closes and the mold cavity 34 is shut off from the overflow portion 78. At this point in time a constant quantity of resin remains in the mold cavity 34, thus completing the measuring step.

Figure 5:
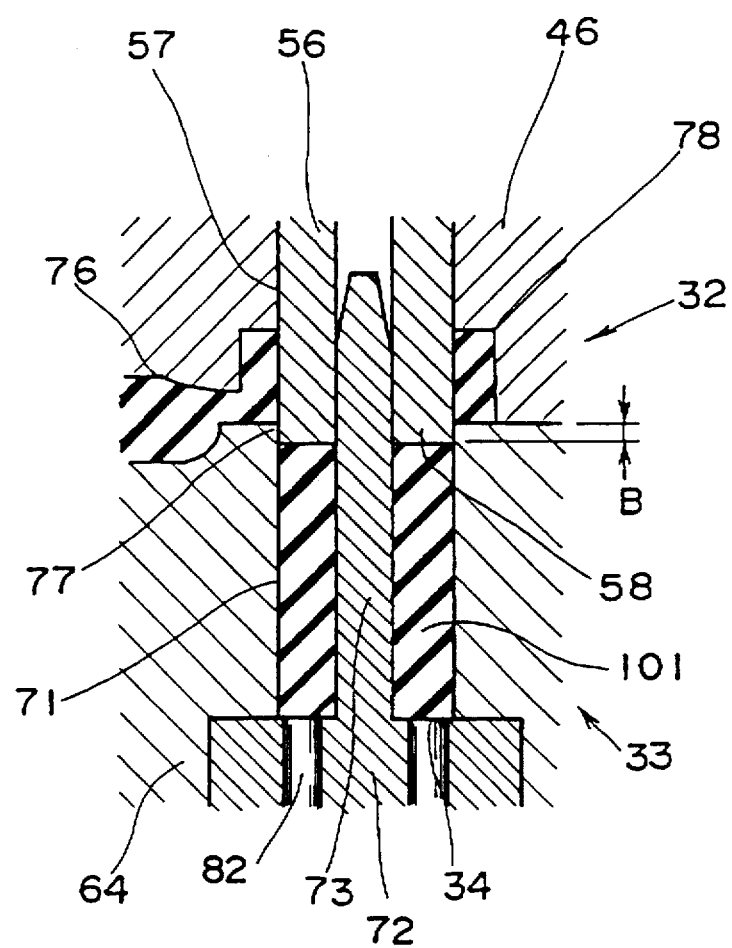
FIG. 5 is an enlarged view in the vicinity of a mold cavity of the mold assembly of FIG. 4.
Figure 6:
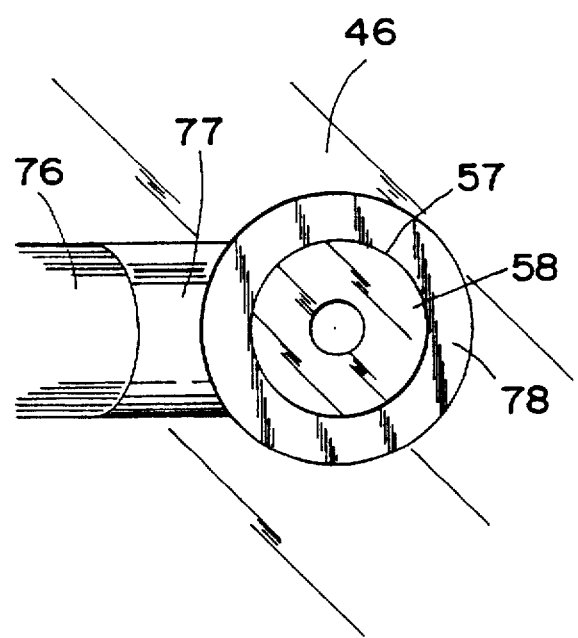
FIG. 6 is a bottom view in the vicinity of a protruding portion of the mold assembly of FIG. 4.

The measuring step is then followed by the compression step where the movable plate 46 and the base member 38 of the fixed mold 32 are closed until they abut together as shown in FIG. 5, and at the same time, the resin in the mold cavity 34 is compressed. The amount B of compression is equal to an opening A3 between the base member 38 and the movable plate 46 at the point in time of completion of the measuring step.

At the time of completion of the pressure adjusting step, the volume of the mold cavity 34, that is to say the amount of resin in the mold cavity 34 is not constant. However, in the subsequent measuring step, as mentioned before, the resin in the mold cavity 34 returns to the runner 76, and at the instant when the gate 77 closes, a constant amount of resin remains in the mold cavity 34. In this way, the pressure and volume of the resin filled into the mold cavity 34 by the pressure adjusting step and the measuring step can be accurately controlled.

With the mold assembly 31, by forming the runner 76 between the movable mold 33 and the movable plate 46 of the fixed mold 32, then in the measuring step, the capacity of the runner 76 does not change. Consequently, the resin returns smoothly to the runner 76 from the reduced capacity mold cavity 34, and hence the pressure of the resin inside the mold cavity 34 can be reliably kept constant. In addition, the mold closing operation can be expedited.

Moreover, since part of the runner 76 together with the overflow portion 78 forming the gate 77 are formed in the movable plate 46 around the protruding portion 58, then cooling of the resin in the region around the mold cavity 34, including the gate 77, is slowed down. Hence during the measuring step, the resin returns more smoothly from the mold cavity 34 to the runner 76. On the other hand, if there were no overflow portion 78, and the gate was a simple side gate, then the cooling and solidification of the resin in the mold cavity would tend to progress more rapidly in the region around the mold cavity so that there was less likelihood of the resin returning smoothly from the mold cavity to the runner. For the overflow portion 78 to achieve an adequate effect, it must be sized to suit the dimensions of the roller 101. Once the gate 77 has closed with the closing of the mold, the compression step commences, and the resin inside the mold cavity 34 is compressed. Since in the measuring step a constant amount of resin at a constant pressure remains in the mold cavity 34, then the compression also can be smoothly carried out. Moreover, the contraction accompanying the solidification of the resin with cooling is compensated for by the compression. Consequently, due to this compensation it is no longer necessary to carry out the pressure holding step on the heated cylinder unit 1 side. The compression also has other beneficial effects such as allowing more rapid solidification of the resin in the mold cavity 34.

After the resin in the mold cavity 34 has cooled and solidified sufficiently, the fixed mold 32 and the movable mold 33 are opened with the mold clamping device 21. Concurrent with this, the resin inside the mold cavity 34, that is to say the solidified resin of the roller 101, the runner 76, and the sprue 41, is separated from the fixed mold 32. The ejector device (not shown in the figure) provided on the mold clamping device 21 side is then operated so that the runner ejector pin 83 pushes out the resin solidified in the runner 76 and the sprue 41, to separate this from the movable mold 33, while the product ejector pins 82 push out the roller 101 to separate this from the movable mold 33. The roller 101 and the resin solidified in the runner 76 and the sprue 41 are then removed, after which the mold is again closed and the above steps repeated.

Figure 8:
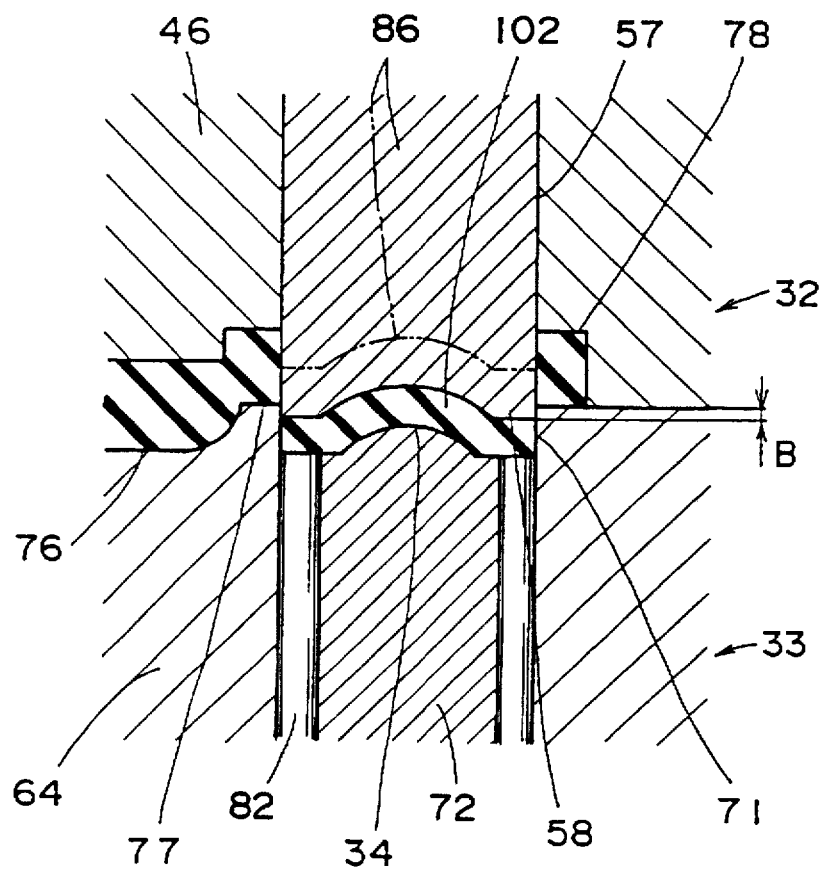
FIG. 8 is a cross-sectional view of part of a mold assembly applicable to molding a lens, used in a second embodiment of the present invention.
Figure 9:
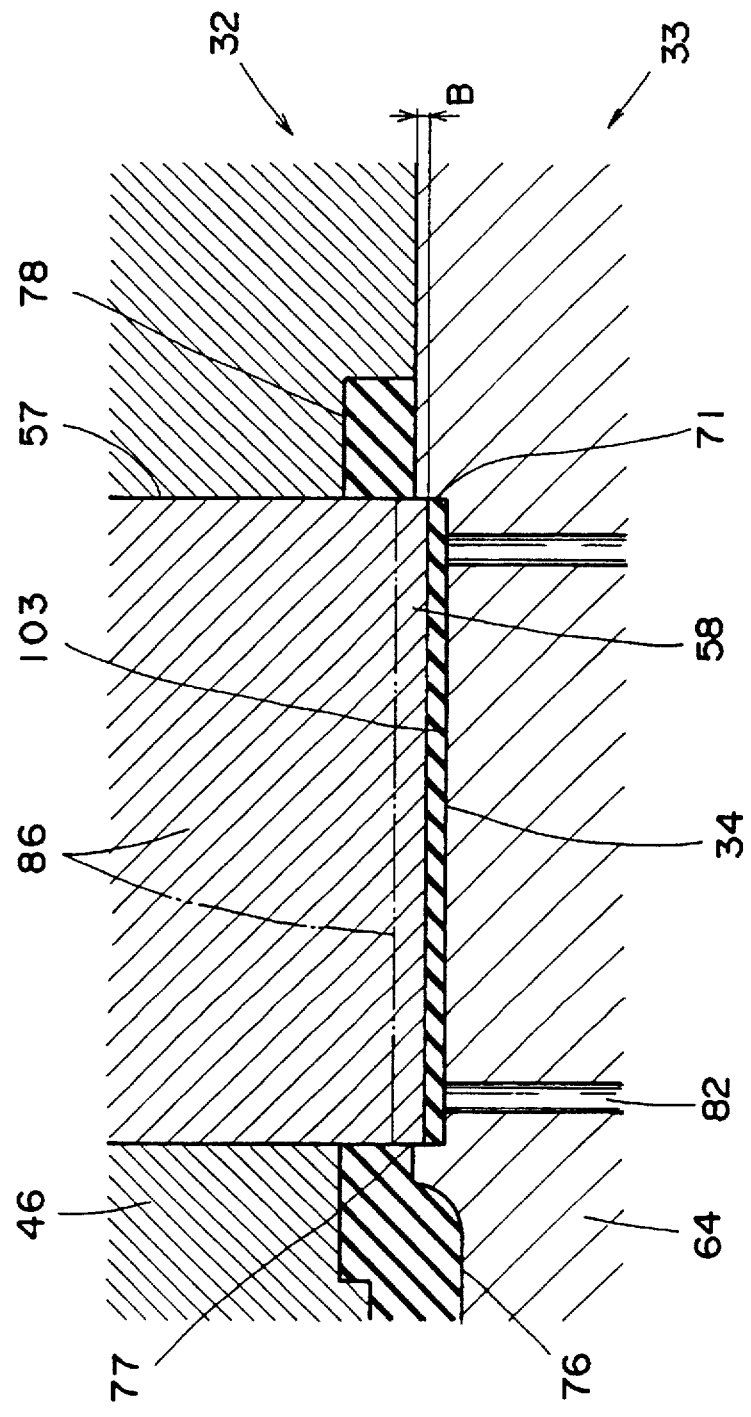
FIG. 9 is a cross-sectional view of a part of a mold assembly applicable to molding a substrate for an IC card, used in a third embodiment of the present invention.
Figure 10:
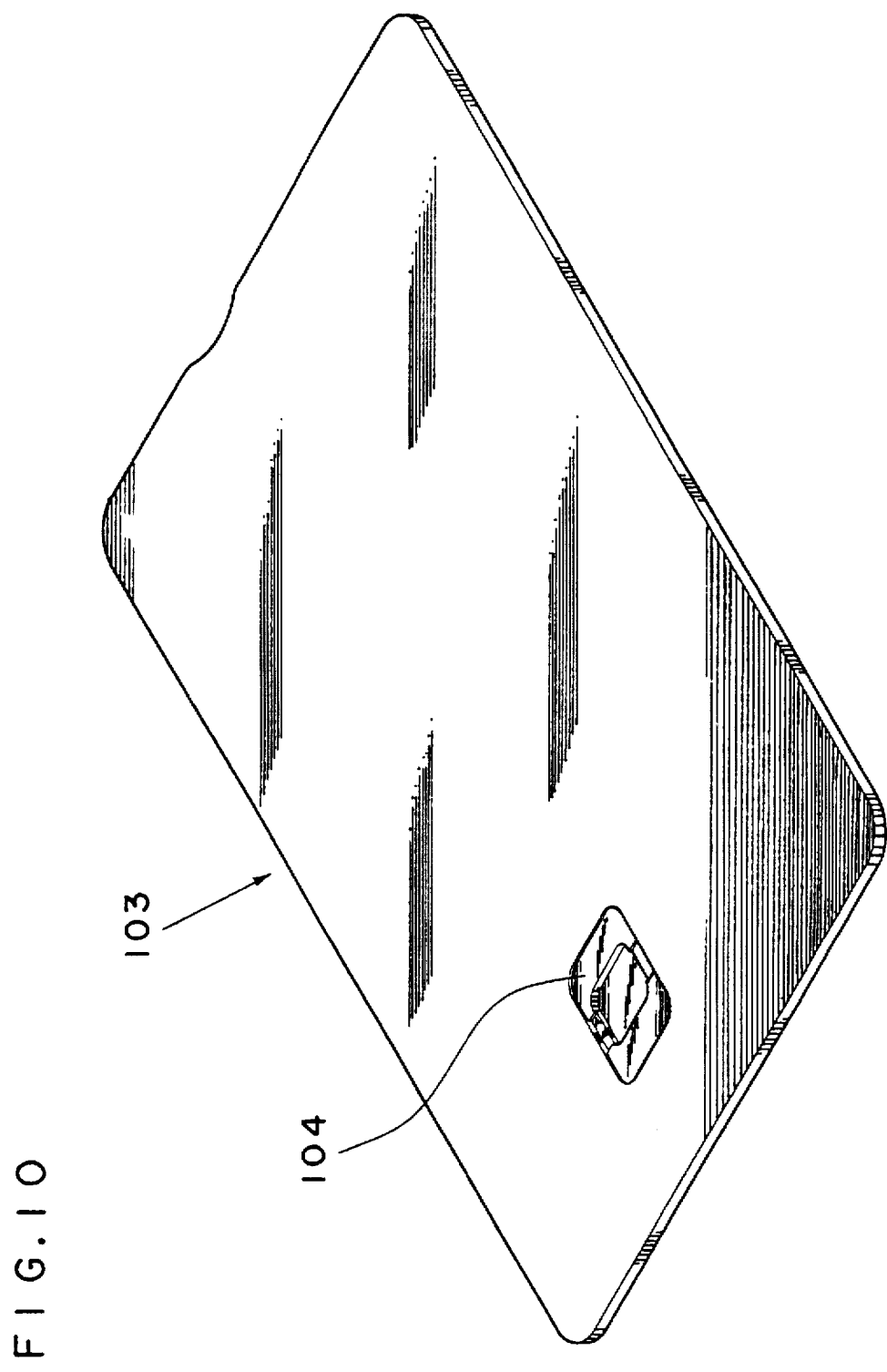
FIG. 10 is a perspective view showing an IC card molded by the mold assembly of FIG. 9.

With the abovementioned embodiment, the molded product was the roller 101. The present invention however can also be applied to molding various other products. With a second embodiment shown in FIG. 8, the present invention is applied to the molding of a meniscus type optical lens 102, while with a third embodiment shown in FIG. 9, the present invention is applied to the molding of an IC card substrate 103. In FIG. 8 and FIG. 9, parts corresponding to the mold assembly of the first embodiment shown in FIG. 1 through FIG. 7 and described above, are indicated by the same symbol and description is hereunder omitted. Furthermore, in FIG. 8 and FIG. 9, only the region near the mold cavity 34 is shown. The construction of the overall mold assembly is the same as for the mold assembly of the first embodiment. FIG. 10, shows the molded IC card substrate 103, being in the form of a thin plate with a recessed IC chip housing 104 formed on one face.

With the lens 102 and the IC card substrate 103, since these have no through hole, then the mold assemblies of the second embodiment and the third embodiment have the sleeve 56 of the mold assembly of the first embodiment replaced with a solid pin or block shaped insertion element 86 which does not engage with the core 72 of the movable mold 33.

The molding method also is the same as for the first embodiment. FIG. 8 and FIG. 9 show the condition wherein the compression step has been completed and the gate 77 closed by the protruding portion 58 on the tip of the insertion element 86 engaging with the recess portion 71 of the movable mold 33. The phantom line in FIG. 8 and FIG. 9 shows the position of the insertion element 86 when the gate 77 is opened in the filling step, the pressure adjusting step, and the measuring step.

The present invention is ideal for molding products requiring high accuracy such as the lens 102, and also gives an improvement in the optical characteristics of the lens 102. Furthermore, the overflow portion 78 is particularly effective with comparatively thin products such as the lens 102 and the IC card substrate 103. With conventional injection molding, when the resin flows from the gate into the mold cavity, the fluidity of the resin is compromised due to the restriction in the region around the mold cavity. Moreover, since solidification progresses more rapidly at the tip portion of the resin flow due to cooling, then although filling may be sufficient, product properties suffer due to residual stress distortion and the like. For example this may result in imperfections such as slightly reduced dimensions at the peripheral portions of the product compared to at other portions. Moreover, with injection molding, when the resin is introduced into the mold cavity, the gas inside the mold cavity (air or resin fumes) must be removed. A small gap is thus formed as a gas vent, for example on the contacting faces of the fixed mold and the movable mold. However if the size of the gap for the gas vent is made too large, a flash will be formed in the product, while if the gap size is made too small, then filling is compromised. With the present invention however, during the filling step, the gas and resin flow out from the mold cavity 34 to the overflow portion 78, so that the gas can be reliably vented. Moreover, the fluidity of the resin in the region around the mold cavity 34 is improved so that the resin can be properly filled up to this region. As a result, residual stress distortion at peripheral portions of the product can be reduced, and properties of the product such as the dimensions at the peripheral portions improved. Moreover, since the overflow portion 78 is finally shut off from the mold cavity 34, with engagement of the protruding portion 58 of the fixed mold 32 in the recess portion 71 of the movable mold 33, then there is no flash formed on the product.

Figure 12:
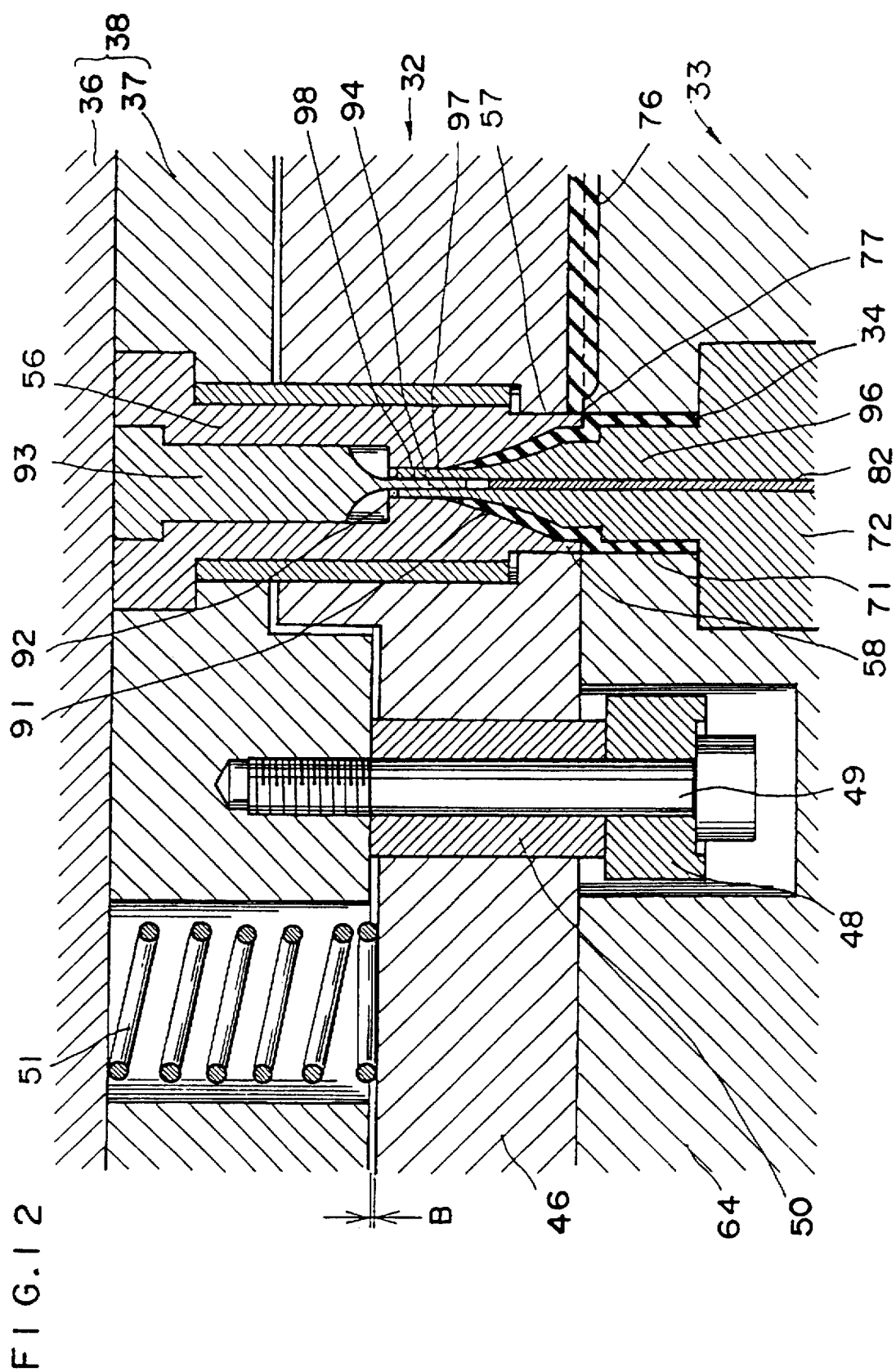
FIG. 12 is a cross-sectional view of a part of the mold assembly of FIG. 11, shown during a measuring step.
Figure 13:
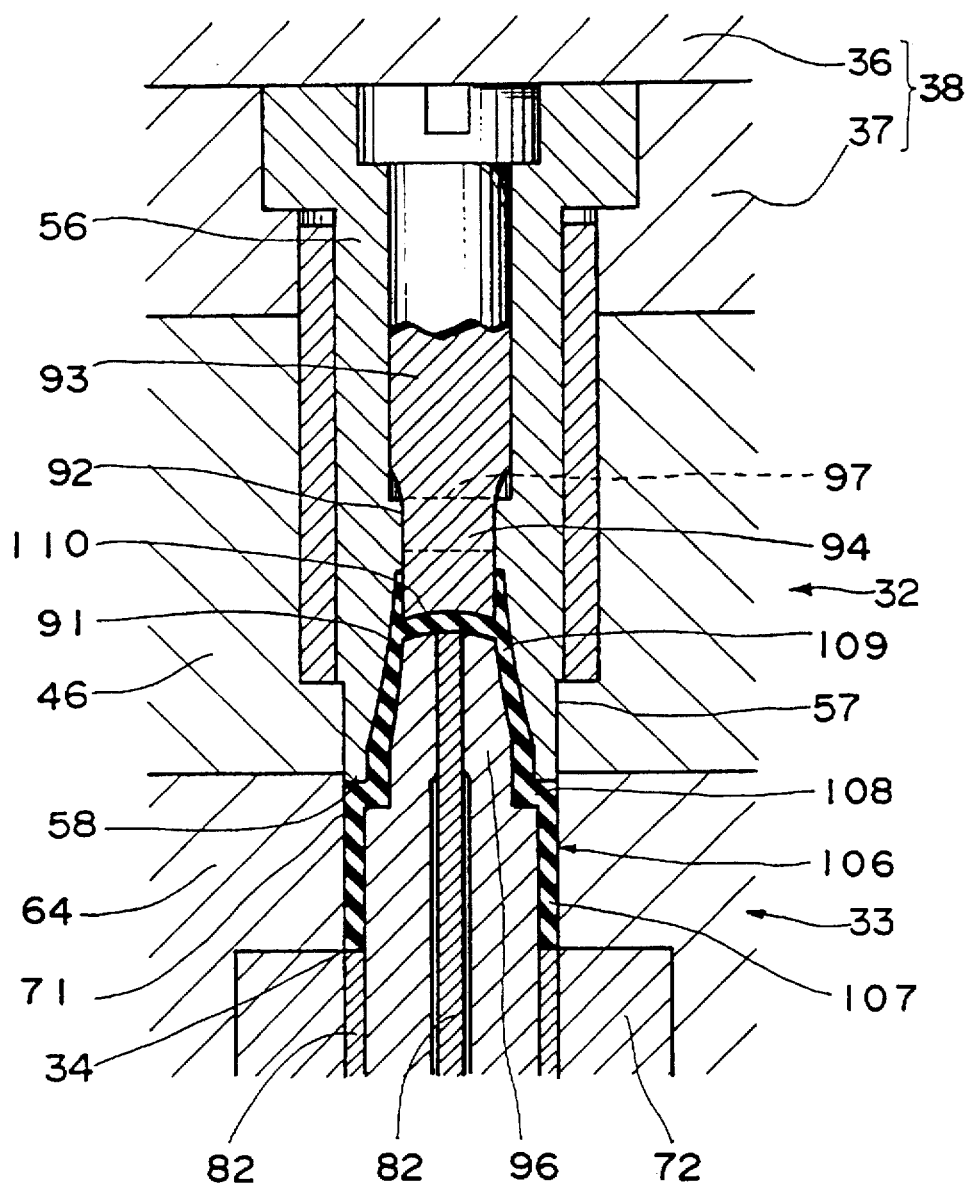
FIG. 13 is a cross-sectional view of a part of the mold assembly of FIG. 11, shown during a compression step, with the cross-section at 90 degrees to that in FIG. 11 and FIG. 12.
Figure 14:
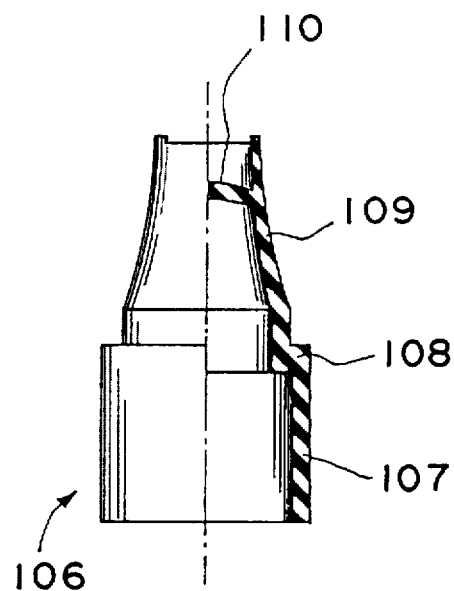
FIG. 14 is a front view with half in cross-section, of a roller holder formed by the mold assembly shown in FIG. 11 through FIG. 13.
Figure 15:
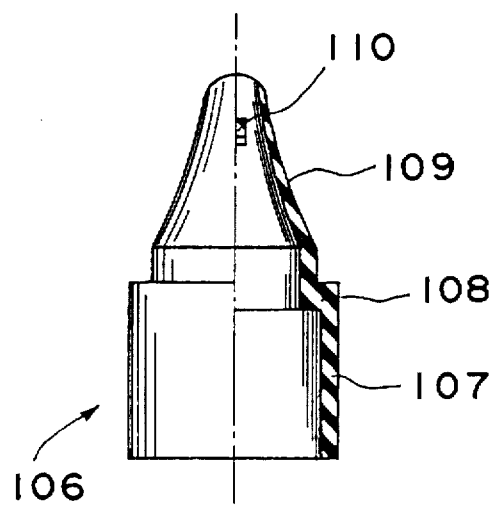
FIG. 15 is a side view with half in cross-section, of the roller holder shown in FIG. 13.

With a fourth embodiment shown in FIG. 11 through FIG. 15, the present invention is applied to molding a roller holder 106 used as a capping tip for a roller pen. As shown in FIG. 14 and FIG. 15, the roller holder 106 has a cylindrical body 107 at a lower end thereof, a step 108 bent radially inward from an upper end of the body 107, and a thin tubular tapered portion 109 protruding upward from an inner periphery of the step 108. Furthermore, inside the taper portion 109 there is a bridge 110 bridging radially across the interior.

When forming a roller holder 106 of the above shape by conventional injection molding, there is the likelihood of insufficient filling due to the particularly thins portions such as the taper portion 109. Furthermore, with the contraction due to cooling, sink marks occur on the outer face of the taper portion 109, particularly at the portion joined by the bridge 110. This type of problem however can be solved by applying the present invention.

Figure 11:
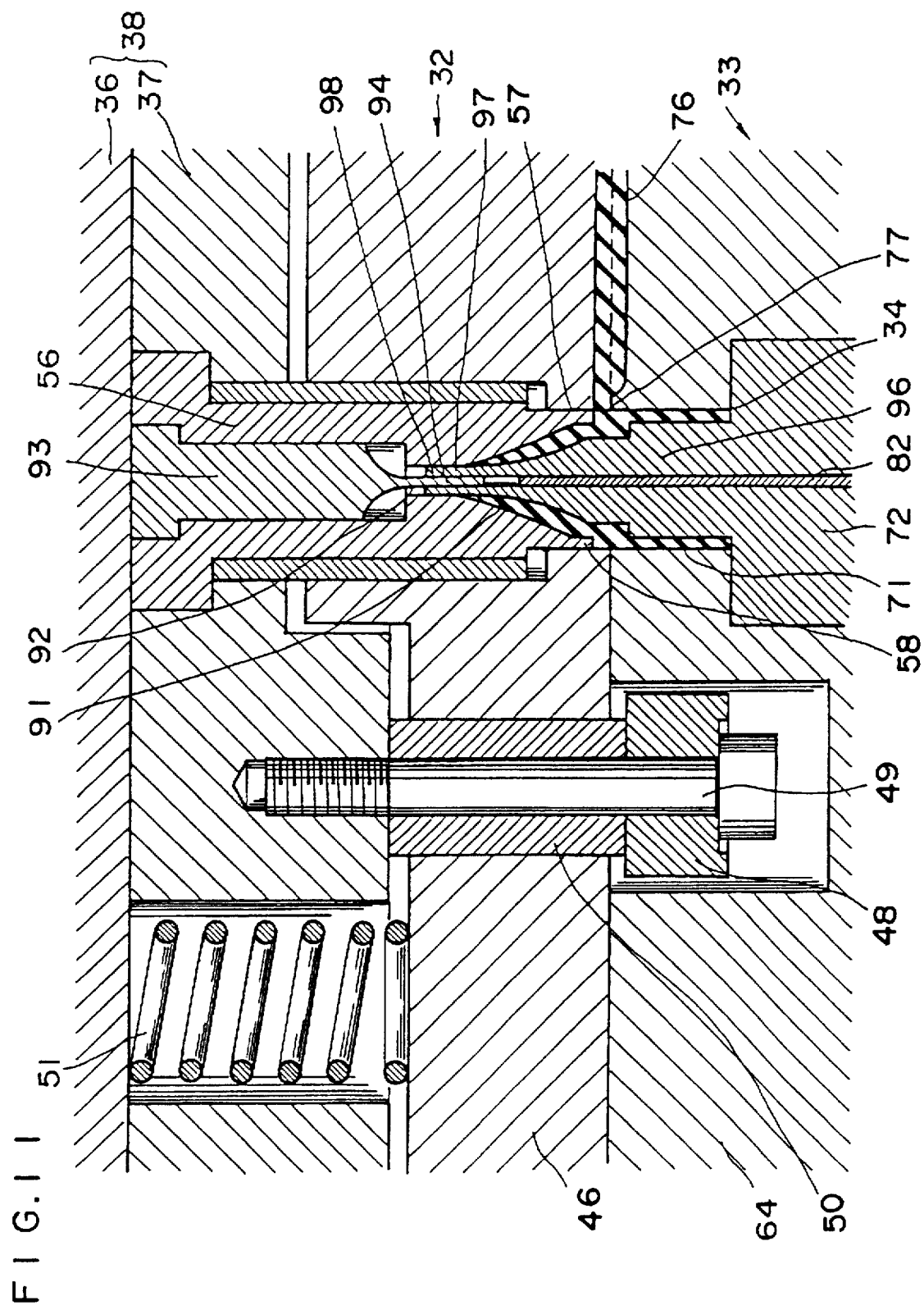
FIG. 11 is a cross-sectional view of a part of a mold assembly applicable to molding a roller holder, used in a fourth embodiment of the present invention, shown during a filling step.

With the mold assembly of the fourth embodiment for producing the roller holder 106, since basically this has the same construction as the mold assembly of the first embodiment, the corresponding parts are indicated by the same symbol and description is omitted. With the mold assembly of the fourth embodiment as shown in FIG. 11 through FIG. 13, a product forming face 91 for forming the outer face of the taper portion 109 of the roller holder 106, is formed on the inside of the tip end of the sleeve 56. Furthermore, an aperture 92 continuing from the product forming face 91 is formed on an internal portion of the sleeve 56. A pin 93 is secured to the base member 38 by clamping between the fixed side attachment plate 36 and the sleeve 56, and a protruding plate portion 94 formed on the tip end of the pin 93, is inserted into the aperture 92 of the sleeve 56.

A protruding portion 96 formed on the core 72 of the movable mold 33 passes coaxially through the recess portion 71 protruding on towards the fixed mold 32. The protruding portion 96 is for forming, on the outer face thereof, the inner face of the roller holder 106 including the taper portion 109. A tip portion of the protruding portion 96 becomes an engaging portion 97 for engaging with the aperture 92 of the sleeve 56 of the fixed mold 32 at the time of closing the mold. Moreover, a slit 98 is formed at the tip end of the protruding portion 96 including the engaging portion 97. The slit 98 is defined by two interior side faces on the protruding portion 96 with an open end, and engages with the protruding plate portion 94 of the pin 93 of the fixed mold 32 at the time of closing the mold. The arrangement is such that the protruding portion 96 passes through the taper portion 109 of the roller holder 106 being formed, and out through the tip end opening of the taper portion 109. The engaging faces of the protruding portion 58 and the recess portion 71, the engaging faces of the aperture 92 and the engaging portion 97, and the engaging faces of the protruding plate portion 94 and the slit 98 thus constitute cylindrical or planar faces parallel with the mold open and close direction. The gap between these engaging faces is kept minimal to prevent formation of flashes on the molded roller holder 106.

The injection molding method using this mold assembly is also basically the same as for the first embodiment. That is to say, at first the mold is closed with a relatively light closing force and filling carried out. At this time, as shown in FIG. 11, the protruding portion 58 of the fixed mold 32 is not engaged with the recess portion 71 of the movable mold 33, and resin is filled from the open gate 77 to inside the mold cavity 34. Once the filling step including the pressure adjusting step is completed, the mold clamping force is increased so that the movable plate 46 is closed against the base member 38 of the fixed mold 32. Concurrent with this, the excess resin inside the mold cavity 34 returns to the runner 76. Then, as shown in FIG. 12, the protruding portion 58 engages in the recess portion 71, thus closing the gate 77, after which the resin inside the mold cavity 34 is compressed.

With this molding operation, the product forming face 91 of the sleeve 56 of the fixed mold 32 forms the upper face of the step 108 and the outer face of the taper portion 109 of the roller holder 106, the end of the protruding plate portion 94 of the pin 93 of the fixed mold 32 forms the upper face of the bridging portion 110, the recess portion 71 of the movable mold 33 forms the outer face of the body 107, and the protruding portion 96 of the movable mold 33 forms the inner face of the roller holder 106 and the two side faces and the lower face of the bridging portion 110.

Since the taper portion 109 of the roller holder 106 is inclined to the mold open and close direction, then even though the finally formed taper portion 109 is thin, in the filling step and the pressure adjusting step, the faces in the fixed mold 32 and the movable mold 33 for forming the taper portion 109 are separated widely apart from each other. Hence the resin can flow smoothly into the portion for the taper portion 109 in the mold cavity 34, so that poor filling does not occur. Moreover, in the compression step, since the sleeve 56 compresses the taper portion 109, then the thin taper portion 109 can be reliably formed without difficulty, and there is no occurrence of sink marks on the outer face of the taper portion 109 at the portion joined by the bridge 110. Furthermore, the compression acting on the taper portion 109 which is inclined to the mold open and close direction, is greater than that on the body portion 107. Moreover since the protruding portion 96 which passes through the inside of the taper portion 109, and the slit 98 which encloses the bridge portion 110 from below, are provided on the movable mold 33, and the aperture 92 for engaging with the protruding portion 96, and the protruding plate portion 94 which engages with the slit 98, are provided integral with the base member 38 on the fixed mold 32, then the whole of the taper portion 109 including the bridge 110 are reliably subjected to compression.

The present invention can be ideally used for forming various other products such as the metal tip of a lead refill pencil. Furthermore, the present invention is not limited to the above mentioned embodiments and various modifications are also possible. For example, with the beforementioned embodiments, the description was given using as an example, the case where an in-line sleeve type injection molding machine was used. However various other types of molding machine such as a plunger type may be used. Furthermore, for the mold clamping device also, various other types such as a toggle type may be used instead of the direct pressure type of the beforementioned embodiments. Moreover, the drive source for the mold clamping machine is not limited to a hydraulic cylinder, and may for example be an electric motor. In addition, the mold assembly also is not limited to that of the beforementioned embodiments. For example, instead of a spring for the biasing device for biasing the movable member, an air cylinder or the like may be used. Furthermore, with the beforementioned embodiments, the description was given using as an example, the injection molding of a thermoplastic resin. However, the present invention may also be applied to injection molding with various types of molding materials, such as injection molding of ceramics using a thermoplastic resin as a binder, injection molding powder metallurgy methods, or injection molding of thermosetting resins or metal.

What is claimed is:

1. A method of injection molding using:

a mold assembly incorporating a first mold member and a second mold member which open and close relative to each other and which form a mold cavity therebetween when closed, said first mold member having:
a base member;
a movable member supported on said base member so as to be movable relative thereto in the open and close direction of said first mold member and said second mold member, and said movable member closes against said second mold member; biasing means for biasing said movable member relative to said base member towards said second mold member; and a protruding portion provided integral with said base member, said second mold member having a recess portion for removably engaging with the protruding portion on said first mold member, the construction being such that said mold cavity is formed by the recess portion and the protruding portion, and a material passage is formed between said movable member and said second mold member so that a gate to said mold cavity is formed therefrom, said gate being closed by said protruding portion engaging in said recess portion;
a material supply apparatus for supplying mold material in a moldable condition to said material passage in said mold assembly; and
a mold clamping device with adjustable clamping force for opening and closing said first mold member and said second mold member of said mold assembly, said method comprising the steps of:
closing said first mold member and said second mold member with a light mold clamping force, and closing said movable member against said second mold member, but leaving said movable member and said base member in an open condition, then supplying mold material from said material supply device to said material passage of said mold assembly to fill said mold cavity;
at the same time, adjusting the pressure of the mold material inside said mold cavity so as to make the density of the mold material even by the displacement of said movable member and said second mold member relative to said base member, as a result of an equilibrium between the pressure of the mold material inside said mold assembly, and the mold clamping force; and
stopping supply of mold material from said material supply device, and increasing the mold clamping force to close the base member and the movable member towards each other, and during this operation, allowing some of the mold material on the mold cavity side to return to said material supply device side, and after a constant amount of mold material remains in said mold cavity at the point in time of closing said gate, closing said base member and said movable member against each other, thereby compressing the mold material inside said mold cavity.

2. An injection molding apparatus comprising:

a mold assembly incorporating a first mold member and a second mold member which open and close relative to each other and which form a mold cavity therebetween when closed, said first mold member having: a base member; a movable member supported on said base member so as to be movable relative thereto in the open and close direction of said first mold member and said second mold member, said movable member closable against said second mold member;

biasing means for biasing said movable member relative to said base member towards said second mold member;

a protruding portion provided integral with said base member, said second mold member having a recess portion for removably engaging with the protruding portion on said first mold member, the construction being such that said mold cavity is formed by the recess portion and the protruding portion, and a material passage is formed between said movable member and said second mold member so that a gate to said mold cavity is formed therefrom, said gate being closed by said protruding portion engaging in said recess portion,;

a material supply apparatus for supplying mold material in a moldable condition to said material passage in said mold assembly;

a mold clamping device with adjustable clamping force for opening and closing said first mold member and said second mold member of said mold assembly;

filling control means for supplying mold material from said material supply device to said material passage of said mold assembly, to fill said mold cavity under conditions wherein said first mold member and said second mold member are closed with a light mold clamping force, and said movable member is closed against said second mold member, but said movable member and said base member are open;

pressure adjustment control means for adjusting the pressure of the mold material inside said mold cavity so as to make the density of the mold material constant during filling by said filling control means, by the displacement of said movable member and said second mold member relative to said base member, as a result of an equilibrium between the pressure of the mold material inside said mold assembly, and the mold clamping force;

measurement control means for increasing the mold clamping force to close said base member and said movable member towards each other, after adjusting the pressure with said pressure adjustment control means, so that mold material on the mold cavity side returns to said material supply device, and at the point in time of closing said gate a constant amount of mold material remains in said mold cavity; and compression control means for closing said base member and said movable member against each other after measurement control by said measurement control means, thereby compressing the mold material inside said mold cavity.

3. An injection molding apparatus according to claim 2, having an overflow portion which is cut-off from said mold cavity when said protruding portion is engaged in said recess portion, extending substantially around the full periphery of said mold cavity.

4. An injection molding apparatus according to claim 3, wherein said protruding portion of said mold assembly slidingly passes through said movable portion, and a depression forming said material passage and said gate as well as said overflow portion is formed in said movable portion surrounding said protruding portion.

5. An injection molding apparatus according to claim 1, wherein said first mold member is a fixed mold, and said second mold member is a movable mold.

6. An injection molding apparatus according to claim 1, wherein said biasing means of said mold assembly is a spring.

* * * * *

UNITED STATES PATENT AND TRADEMARK OFFICE
Certificate

Patent No. 5,776,407                                                                                      Patented: July 7, 1996

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Yoshinobu Takeda, Niigata-shi, Japan; Yoshio Yamada, Tokyo, Japan.

Signed and Sealed this Twelth Day of June, 2001.

JILL H. SILBAUGH
*SPE*
Art Unit 1732

UNITED STATES PATENT AND TRADEMARK OFFICE
Certificate

Patent No. 5,776,407                                        Patented: July 7, 1996

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Yoshinobu Takeda, Niigata-shi, Japan; and Yoshio Yamada, Tokyo, Japan.

Signed and Sealed this Second Day of October, 2001.

JAN H. SILBAUGH, *SPE*
                                                                                       Art Unit 1732